United States Patent

[11] 3,607,332

[72] Inventor Harold T. Wingfield
 Birchwood, Minn.
[21] Appl. No. 714,459
[22] Filed Mar. 20, 1968
[45] Patented Sept. 21, 1971
[73] Assignee Minnesota Mining and Manufacturing Company
 St. Paul, Minn.

[54] MODELING COMPOSITION
 7 Claims, No Drawings
[52] U.S. Cl. .................................................. 106/243,
 106/266, 106/268, 106/272
[51] Int. Cl. ..................................................... C08h 9/00

[50] Field of Search .......................................... -
 106/38.2–38.9, 266, 272, 122, 243, 268

[56] References Cited
UNITED STATES PATENTS
| | | | |
|---|---|---|---|
| 861,294 | 7/1907 | Lanza | 106/272 |
| 3,365,315 | 1/1968 | Beck et al. | 106/40 |

Primary Examiner—Lorenzo B. Hayes
Attorney—Kinney, Alexander, Sell, Steldt & Delahunt ABSTRACT: Thermoplastic modeling compositions which are resistant to cracking on standing after they have been molded. Preferably lightweight, they are relatively soft and easily molded at elevated temperatures and are slump or distortion-resistant but still pliable and finger-pressure deformable at room temperature. Distributed throughout the modeling compositions are rigid, regularly shaped microparticles, e.g., in the form of spheres or platelets.

3,607,332

MODELING COMPOSITION

BACKGROUND OF THE INVENTION

1. Field of the Invention

This invention relates to thermoplastic modeling compositions which are resistant to cracking and preferably lightweight. The compositions of the invention are plastic and moldable at elevated temperatures and more rigid and slump or distortion-resistant but still pliable and finger-pressure deformable at room temperature Distributed throughout the modeling compositions are rigid regularly shaped microparticles, e.g., in the form of spheres or platelets, the preferred form being rigid hollow microbubbles. Microparticles are herein defined 500 microns or smaller in size.

2. Description of the Prior Art

It has been the practice in the styling and industrial design trades, particularly in the automotive industry, to construct full scale, detailed models or prototypes with modeling clays prior to manufacturing the marketable product. Often these modeling clays or compositions are thermoplastic and comprise a mixture of sulfur, naturally occurring clays, crystalline aliphatic esters and fatty acids. Normally they are heated until pliable and applied to a generalized outline of the model called a buck, which is a structural material such as wood, and formed thereon while the clay is still warm and pliable. As the clay prototype is cooled to room temperature, it becomes more rigid and loses much of its plasticity. In the case of an automobile prototype, for example, the clay is distributed unevenly on the buck and its thickness may vary from thin layers of one-fourth inch to thicker layers of 8 to 12 inches. A finished automobile prototype so constructed may weigh as much as 5000 pounds and the modeling clay employed will normally exhibit several cracks or fissures after a period of about 24 hours. Such cracks tend to weaken the structural integrity of the model and detract from its aesthetic qualities; furthermore continued repair of such cracks is time consuming. Since the clay prototypes are commonly used as models for making plaster or fiberglass casts, the cracking occurring in the clay prototype within a relatively short period of time is particularly undesirable since the cast must be made quickly, before cracks occur, thus requiring minor styling modifications to be made in haste.

Accordingly, it is an object of the present invention to provide a modeling composition which is resistant to cracking on standing and preferably lightweight, and which is relatively soft and easily molded at elevated temperatures while being slump or distortion-resistant but still pliable and finger-pressure deformable at room temperature.

Other objects and advantages will become evident from the following detailed but nonlimiting

DESCRIPTION OF THE INVENTION

It has been found that on intimate mixture of a plastic, claylike mass, comprising finely divided filler material, at least a portion of which being clay and a plasticizing organic vehicle for said filler material; together with from about 10 to about 50 volume percent of rigid, regularly shaped microparticles, provides a thermoplastic modeling composition which accomplishes the above noted objects. The microparticles used in the practice of the invention are preferably hollow microspheres, but may alternatively be in the form of tiny platelets or microcylinders.

The physical properties of the modeling compositions of the present invention may be adjusted to suit the need of the user by varying the quantities and types of filler, vehicle and microparticles employed. Thus fillers may be selected from finely divided, particulate materials such as are often found in known modeling compositions. In order to provide a composition which is deformable, yet has the desired cohesive strength, the filler selected should include a portion of clay. By clay is meant either naturally occurring clays such as kaolinite, montmorillonite or bentonite, as well as modified clays such as amine modified bentonite, known commercially under the trade name "Bentones," which are reaction products of cation exchange reactions between organic bases and bentonite and have a platelet-type structure.

Other finely divided filler materials having relatively high softening and melting points, preferably higher than 150° F., such as sulfur, calcium carbonate, and zinc stearate are mixed with the clay in proportions to give the composition the desired consistency and workability. A particularly suitable filler comprises 15–30 weight percent sulfur, 40–80 weight percent clay, and 15–30 weight percent zinc stearate. Further, while it is to be understood that the amount of filler employed in the final modeling composition may be varied to suit the needs of the user, preferred modeling compositions of the invention contain from 40 to 60 weight percent filler material.

The claylike mass further includes a thermosoftening, plasticizing vehicle for lubricating and binding the filler material. Oils, waves and greases, or mixtures thereof such as are commonly found in known modeling compositions are acceptable. Solids contained in the vehicle should melt or soften between 100° F. and 175° F., preferably between Φ° F. and 150° F. and should not react chemically to produce a permanent phase change. By variation of the amount and type of vehicle employed, the physical properties of the composition can be altered so as to effect specific consistency and workability requirements. Suitable vehicles may include the following materials and mixtures thereof: oils, such as glycerin, fatty acids, polymerized fatty acids, rosin oils, palm oils; greases such as lanolin, petrolatums, tallow; and thermoplastic solids such as paraffin waxes, beeswax and crystalline aliphatic esters.

Preferred vehicles include approximately 30 to 75 weight percent dimer and trimer acids, e.g., those derived from wood rosin; approximately 0 to 45 weight percent of lanolin or glycerin and approximately 20 to 40 weight percent of hydrocarbon wax, e.g., paraffin.

Preferred modeling compositions of the invention include from about 10 to about 50 volume percent of regularly shaped microparticulate material which effects a distinct resistance to cracking in the compositions in standing after it has been molded. Preferably, the microparticles are rigid, hollow microbubbles (e.g., as described in U.S. Pat. 3,365,315, Beck et al., issued Jan. 23, 1968) so as to further effect a significant reduction in density which improves the slump resistance of the composition. It has been found that the use of amine modified clays, as described above, also improves the resistance to cracking of the compositions in addition to the improvement provided by the microbubbles. When naturally occurring clays such as kaolinite, bentonite and montmorillonite are employed as the clay portion of the filler, it is preferable that the glass microbubbles be first treated with a glass surface treatment (e.g. a glass coupling agent) in order to effect a resistance to cracking comparable to that provided by the use of untreated microbubbles in combination with amine-modified clays.

Depending on the consistency of the composition desired, suitable microbubbles may be selected within a diameter range of the order of 5 to 300 microns. In cases where a smooth consistency into modeling composition is not required, microspheres of larger diameters may be employed. Preferred microbubbles are those having average diameters of between 10 and 150 microns since those with diameters above 150 microns impart a somewhat coarse consistency to the composition. Particularly preferred for automobile prototype styling and the like are microbubbles having diameters of between 10 and 100 microns. When modeling compositions of significantly reduced density are desired microbubbles having densities of the order of 0.10 to 0.60 g./cc. are acceptable while those with densities of from 0.20 to 0.40 g./cc. are preferred.

As noted above, when glass microspheres are employed in compositions having naturally occurring clays as the clay portion of the filler, the microspheres should be preliminarily treated with a glass surface treatment. Suitable or this purpose is a glass coupling agent consisting essentially of an aqueous solution of a Werner-type compound such as a chrome complex of methacrylic acid. Other glass coupling agents such as organo silane compounds will be evident to those skilled in the art.

Further examples of microspheres which are effective in reducing cracking in modeling compositions are hollow glass microbubbles, solid glass microspheres, solid epoxy microspheres, expanded polystyrene spheres, and phenolic microbubbles. Platelet-type microparticles such as expanded vermiculite are also effective to reduce cracking. Alternatively, microcylinders, such as those obtained from short length microfibers could be employed. As noted above, hollow microparticles are employed in preparing the preferred low density modeling compositions.

While noncracking modeling compositions of the invention may include from about 10 to about 50 volume percent of microspheres, preferred compositions are those which include 20 to 40 volume percent microspheres. The inclusion of such a volume percent of microbubbles effects a reduction in density of 13–27 percent when microbubbles of a density of 0.35 g./cc. are employed and substantially reduced cracking in the final modeling composition. Modeling compositions including greater than 50 volume percent microspheres generally are short, coarse and have little cohesive strength although the composition may be modified to remedy these shortcomings, while those including less than 10 volume percent are not preferred since at these low percentages cracking in the modeling composition is not sufficiently reduced.

Preferred embodiments of the invention, particularly useful, for example, in automobile prototype styling, include the following weight percentages of fillers, vehicle and microspheres wherein clay forms at least 10 percent of the composition.

| | |
|---|---|
| modeling | 40–60 |
| vehicle | 30–45 |
| microspheres | 20–40 |

In addition, modelling compositions of the invention may optionally include coloring agents or the like. Pigments such as chrome oxide, carbon black, oil ground chrome yellow or the like are preferred to dyes since they do not stain materials with which they come into contact.

The following examples are provided as being illustrative of specific preferred embodiments of the invention. They are not to be considered as limiting the scope of the invention.

DESCRIPTION OF TEST FOR DETERMINING THE AMOUNT AND DEGREE OF CRACKING

30–35 cc. f the modeling composition to be tested were molded on one end of a 5–6 inch × 1/2 inch × 3/4 inch piece of wood in the form of a drum stick. The modeling composition was molded to cover approximately one-half the length of the stick and extended over the end thereof by approximately one-half inch. Absorptive paper toweling was placed over the exposed portion of the wood and the entire piece soaked with water. Both pine and mahogany woods were used and the sticks were cut with the grain of the wood running parallel to the length thereof. Measurements taken of the sticks before and after water soaking indicated an area expansion of approximately 5.5 percent across the grain. Density measurements of the modeling compositions were determined with an air comparison Pycnometer. Lightweight modeling compositions were defined as having densities of 1.1 g./cc. or less:

EXAMPLE I

A. Two batches of modeling compositions were formulated having weight percent compositional analyses as follows:

| | Composition A | Composition B |
|---|---|---|
| Weight percent sulfur | 36.2 | 28.4 |
| Weight percent Kaolin | 36.2 | 46.0 |
| Weight percent Beeswax | 8.3 | 7.4 |
| Weight percent wood rosin-derived dimer acid ("Empol 1010") | 10.2 | 16.2 |
| Weight percent zinc stearate | 9.3 | 2.0 |
| Density g/cc | 1.7 | 1.7 |

Both compositions were mixed in a small sigma blade mixer heated to 130° F., with hot water. The beeswax was charged into the mixer after it had melted, the remaining components being then added and mixed thoroughly for one hour. Composition A was relatively short, crumbly and of low cohesive strength. Composition B was of suitable consistency as a modeling composition. Both compositions were subjected to the above described cracking test. Both compositions exhibited several cracks within 2 hours. Both were severely cracked after 3 days.

B. A modeling composition of similar compositional analysis to composition B above, except microbubbles treated with a Werner-type glass coupling agent were added. The weight percent compositional analysis was as follows:

COMPOSITION C

| | |
|---|---|
| Weight % Sulfur | 11.1 |
| Weight % Kaolin | 40.3 |
| Weight % Beeswax | 9.8 |
| weight % Dimer acid (Empol 1010) | 18.1 |
| Weight % Zinc stearate | 9.5 |
| Weight % Glass microbubbles (Average bubble density of 0.35; average bubble diameter of 20–80 microns) | 11.2 |
| Density (g/cc.) | 1.0 |

The composition was of good workable consistency. After being subjected to the cracking test for 3 days only one hairline fissure one-eighth inch long was observed.

EXAMPLE II

Four compositions were formulated, all containing microbubbles with an average bubble density of 0.35 g./cc. and an average diameter of between 20 and 80 microns. The microbubbles in Compositions D, E and F were not treated with a glass coupling agent. Composition G contained microbubbles treated with a solution of methacrylate-chromium complex in isopropanol available under the trade name "Volan-A" from E. I. DuPont. The compositions contained the following weight percent compositional analyses:

| | D | E | F | G |
|---|---|---|---|---|
| Weight % lanolin | 14.7 | | 14.9 | 12.6 |
| Weight % paraffin wax | 10.9 | 10.4 | 12.1 | 12.4 |
| Weight % dimer acid (Empol 1010) | 12.9 | 20.7 | 14.3 | 14.7 |
| Weight % zinc stearate | 10.4 | 9.8 | 11.4 | 11.7 |
| Weight % bentonite | 35.6 | 34.2 | | |
| Weight % sulfur | 12.4 | 5.1 | 13.7 | 14.1 |
| Weight % microballoons | 7.1 | 11.9 | 13.8 | 14.2 |
| Weight % flake graphite | | 7.9 | | |
| weight % Bentone 11 | | | 19.8 | 20.3 |
| Density g./cc. | 1.2 | 1.0 | 0.9 | 0.9 |

All of the compositions exhibited properties which made them acceptable as modeling compositions. All were easily worked and modeled at 125° F. and became more rigid and distortion-resistant but still remained pliable and finger-pressure deformable at room temperatures. Compositions E, F and G had preferred densities; Composition D was not considered lightweight. Composition E was somewhat undesirable because the graphite contained therein rubbed off and became embedded in the pores of the hands. Each of the compositions was subjected to the cracking test. Compositions E, F and G exhibited no cracks after 6 hours while Composition D had no short hairline crack. After 3 days, compositions D and E exhibited only a few short hairline cracks. Compositions F and G exhibited no cracking whatever.

EXAMPLE III

A composition containing solid glass beads having an average particle density of 2.5 g./cc. and an average particle diameter of from 30 to 38 microns was formulated comprising the following weight percent compositional analysis:

| | |
|---|---|
| Weight % paraffin wax | 6.6 |
| Weight % lanolin | 6.7 |
| Weight % dimer acid (Empol 1010) | 7.9 |
| Weight % zinc stearate | 6.2 |
| Weight % Bentone 11 | 10.9 |
| Weight % sulfur | 7.5 |
| Weight % glass beads | 54.2 |
| Density | 1.6 g./cc. |

The resulting modeling composition was subjected to the cracking test. After 6 hours, no cracks appeared. After 3 days, a few short hairline cracks were observed.

EXAMPLE IV

A composition containing expanded polystyrene beads having an average particle density of 0.12 g./cc. and diameters ranging between 590 and 840 microns was formulated comprising the following weight percent compositional analysis:

| | |
|---|---|
| Weight % paraffin wax | 13.7 |
| Weight % lanolin | 13.9 |
| Weight % Dimer acid (Empol 1010) | 16.3 |
| Weight % zinc stearate | 12.9 |
| Weight % Bentone 11 | 22.2 |
| Weight % sulfur | 15.6 |
| Weight % expanded polystyrene beads | 5.4 |
| Density | 0.9 g./cc. |

Although the resulting composition exhibited a coarse and grainy consistency and a smooth surface finish could not be obtained examination of the formed sample after 3 days exposure to the cracking test revealed that no cracking had occurred.

What I claim is:

1. A thermoplastic modeling composition, substantially free of volatile constituents, having plastic and moldable properties at temperatures of the order of Φ° F. to 150° F. so as to be relatively soft and easily molded at said temperatures and being more rigid and slump or distortion resistant but still pliable and finger-pressure deformable at room temperature, said composition of matter comprising an intimate mixture of
a plastic-claylike mass comprising:
finely divided particulate solid filler, at least 10 per cent by weight of which is clay, together with
a thermoplastic plasticizing organic vehicle therefor
and having distributed therethrough between about 10 and 50 volume percent of rigid microparticles of predetermined regular shape and size,
said composition being resistant to cracking on standing after it has been formed.

2. The composition of claim 1 wherein said claylike mass has a weight percent compositional analysis comprising the following:

| | |
|---|---|
| finely divided solid inorganic filler including | |
| finely divided clay | 10 to 50 |
| sulfur | 0 to 40 |
| Plasticizing organic vehicle including: | |
| hydrocarbon waxes | 3 to 20 |
| oils | 5 to 25 |
| greases | 0 to 20 | wherein said clay is selected from the group consisting of naturally occurring clays and the reaction products resulting from cation exchange reactions between organic bases and montmorillonite
and wherein solid components of said plasticizing organic vehicle have melting or softening points of the order of 100° F. to 175° F.,
wherein said regularly shaped rigid microparticles are selected from the group consisting of rigid, hollow microbubbles, solid microspheres, platelet shaped particles, and microcylinders.

3. The composition of claim 2 wherein said regularly shaped microparticles are rigid, hollow microbubbles having an average bubble diameter of the order of 5 to 150 and having an average bubble density or the order of 0.10 to 0.6 g./cc.

4. The composition of claim 3 wherein the microbubbles have average densities of the order of 0.20 to 0.40 g./cc.

5. The composition of claim 3 wherein said rigid, hollow microbubbles are glass and have been treated with a glass treatment agent.

6. The composition of claim 5 wherein the flask treatment agent is selected from the group consisting of glass coupling agents of the Werner complex-type and organosilane compounds.

7. A thermoplastic light weight modeling composition, having plastic and moldable properties at temperatures of the order of 100° F. to 150° F. so as to be relatively soft and easily molded at said temperature and being more rigid and slump or distortion-resistant but still pliable and finger-pressure deformable at room temperature comprising an intimate mixture of the following components: lanolin, dimer acid, zinc stearate, reaction products of cation exchange reactions between organic bases and bentonite, sulfur, and between about 10 and 50 volume percent of rigid, hollow microbubbles having average diameters of the order of 10 150 microns and average densities of the order of 0.010 to 0.60 microns and average densities of the order of 0.10 to 0.60 g,/cc., said composition being resistant to cracking on standing after it has been molded.

UNITED STATES PATENT OFFICE
CERTIFICATE OF CORRECTION

Patent No. 3,607,332        Dated  September 21, 1971

Inventor(s)  Harold T. Wingfield

It is certified that error appears in the above-identified patent and that said Letters Patent are hereby corrected as shown below:

Column 1, line 13, after "temperature" insert --,--.
Column 2, line 25, delete " ₤°F." and insert --100° F. --.
Column 3, line 41, delete "modeling" and insert --fillers--;
   line 57, after "cc." delete "f" and insert --of--.
Column 5, line 59, delete " ₤°F." and insert --100° F.--.
Column 6, line 37, after "150" and before "and" insert --microns--; line 44, delete "flask" and insert --glass--; line 59, delete the phrase "average densities of the order of 0.010 to 0.60 microns and".

Signed and sealed this 25th day of April 1972.

(SEAL)
Attest:

EDWARD M.FLETCHER,JR.          ROBERT GOTTSCHALK
Attesting Officer              Commissioner of Patents

UNITED STATES PATENT OFFICE
CERTIFICATE OF CORRECTION

Patent No. 3,607,332      Dated September 21, 1971

Inventor(s) Harold T. Wingfield

It is certified that error appears in the above-identified patent and that said Letters Patent are hereby corrected as shown below:

Column 6, line 37, after "150" insert -- microns -- .

Signed and sealed this 20th day of March 1973.

(SEAL)
Attest:

EDWARD M. FLETCHER, JR.
Attesting Officer

ROBERT GOTTSCHALK
Commissioner of Patents